United States Patent
Drummond et al.

(10) Patent No.: US 6,264,098 B1
(45) Date of Patent: Jul. 24, 2001

(54) TUBULAR CONTAINER WITH A HEAT SEAL HAVING NON-SYMMETRICAL INNER AND OUTER BEADS

(75) Inventors: Michael T. Drummond, Laurinburg, NC (US); Alan D. Williams, Camden, SC (US); Floyd H. Boatwright, Hartsville, SC (US); Jeffrey M. Schuetz, Florence, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 09/416,184

(22) Filed: Oct. 11, 1999

Related U.S. Application Data

(63) Continuation-in-part of application No. 09/065,783, filed on Apr. 23, 1998, now Pat. No. 5,979,748, which is a continuation-in-part of application No. 08/796,793, filed on Feb. 6, 1997, now Pat. No. 5,829,669.

(51) Int. Cl.[7] .................................................... B65D 5/64
(52) U.S. Cl. .................... 229/123.1; 156/69; 220/359.3; 229/5.5
(58) Field of Search ................ 229/5.5, 123.1, 229/125.35; 156/69; 53/478, 485; 220/359.2, 359.3, 359.4

(56) References Cited

U.S. PATENT DOCUMENTS

| | | | |
|---|---|---|---|
| 3,279,333 | * 10/1966 | Blair et al. | 493/297 |
| 3,338,270 | * 8/1967 | Denenberg | 229/5.82 |
| 3,428,239 | * 2/1969 | Wannamaker et al. | 229/5.6 |
| 3,441,197 | * 4/1969 | White | 229/202 |
| 3,457,130 | * 7/1969 | Morrison | 229/4.5 |
| 3,491,935 | 1/1970 | Trotter, Jr. et al. . | |
| 3,494,812 | * 2/1970 | Cvacho | 493/293 |
| 3,520,463 | * 7/1970 | Ahlemeyer | 229/4.5 |
| 3,524,779 | * 8/1970 | Masters et al. | 229/4.5 |
| 3,555,976 | * 1/1971 | Carter et al. | 493/292 |
| 3,623,929 | * 11/1971 | Wannamaker et al. | 493/292 |
| 3,656,513 | * 4/1972 | Evans et al. | 229/4.5 |
| 3,712,534 | * 1/1973 | Fienup et al. | 229/202 |
| 3,724,742 | * 4/1973 | Henderson | 229/202 |
| 3,817,417 | 6/1974 | Edwards . | |
| 3,892,351 | 7/1975 | Johnson et al. . | |
| 3,946,872 | 3/1976 | Sturm . | |
| 3,973,719 | 8/1976 | Johnson et al. . | |
| 4,171,084 | * 10/1979 | Smith | 229/5.5 |
| 4,171,236 | 10/1979 | Winchell et al. . | |
| 4,196,841 | 4/1980 | Smith et al. . | |
| 4,235,341 | * 11/1980 | Martin et al. | 229/202 |
| 4,280,653 | 7/1981 | Elias . | |
| 4,381,848 | 5/1983 | Kahn . | |
| 4,469,258 | * 9/1984 | Wright et al. | 229/123.1 |
| 4,519,499 | 5/1985 | Stone et al. . | |
| 4,557,414 | 12/1985 | Ford et al. . | |
| 4,717,374 | * 1/1988 | Elias | 493/292 |
| 4,865,217 | 9/1989 | Yoshimoto . | |
| 4,961,513 | 10/1990 | Gossedge et al. . | |

(List continued on next page.)

Primary Examiner—Gary E. Elkins
(74) Attorney, Agent, or Firm—Alston & Bird LLP

(57) ABSTRACT

A sealed composite container for products is provided having a paperboard body ply with a liner ply adhered on the inner surface thereof. One end of the container is rolled outwardly to form a rim and exposing the inner surface of the liner ply, which comprises a heat sealable composition. A lid for the container, also having a layer of heat sealable composition, is placed adjacent to the exposed heat sealable composition of the container liner and heat sealed thereto. The heat seal has both an inner and an outer bead formed on either side of the heat sealed area, wherein the inner bead comprises a larger amount of the heat seal compositions than the outer bead. A method and apparatus for forming the heat seal is also provided.

28 Claims, 6 Drawing Sheets

U.S. PATENT DOCUMENTS

| | | |
|---|---|---|
| 5,002,223 | 3/1991 | Bolte et al. . |
| 5,062,569 * | 11/1991 | Hekal .................................. 220/359.3 |
| 5,076,440 * | 12/1991 | Drummond ........................... 229/202 |
| 5,084,284 * | 1/1992 | McDilda et al. ...................... 229/202 |
| 5,098,751 | 3/1992 | Tamura et al. . |
| 5,160,767 | 11/1992 | Genske et al. . |
| 5,167,339 | 12/1992 | Takata et al. . |
| 5,176,314 | 1/1993 | Akazawa et al. . |
| 5,205,479 * | 4/1993 | Rice et al. ........................... 229/202 |
| 5,213,227 | 5/1993 | Koyama et al. . |
| 5,240,133 | 8/1993 | Thomas, Jr. . |
| 5,251,809 * | 10/1993 | Drummond et al. ................. 229/4.5 |
| 5,281,453 * | 1/1994 | Yamada et al. .................... 220/359.3 |
| 5,316,603 | 5/1994 | Akazawa et al. . |
| 5,326,023 * | 7/1994 | Rice et al. ........................... 229/202 |
| 5,415,910 * | 5/1995 | Knauf ................................... 229/4.5 |
| 5,829,669 | 11/1998 | Drummond et al. . |
| 5,846,619 | 12/1998 | Cahill et al. . |
| 5,979,748 * | 11/1999 | Drummond et al. ............. 229/123.1 |

\* cited by examiner

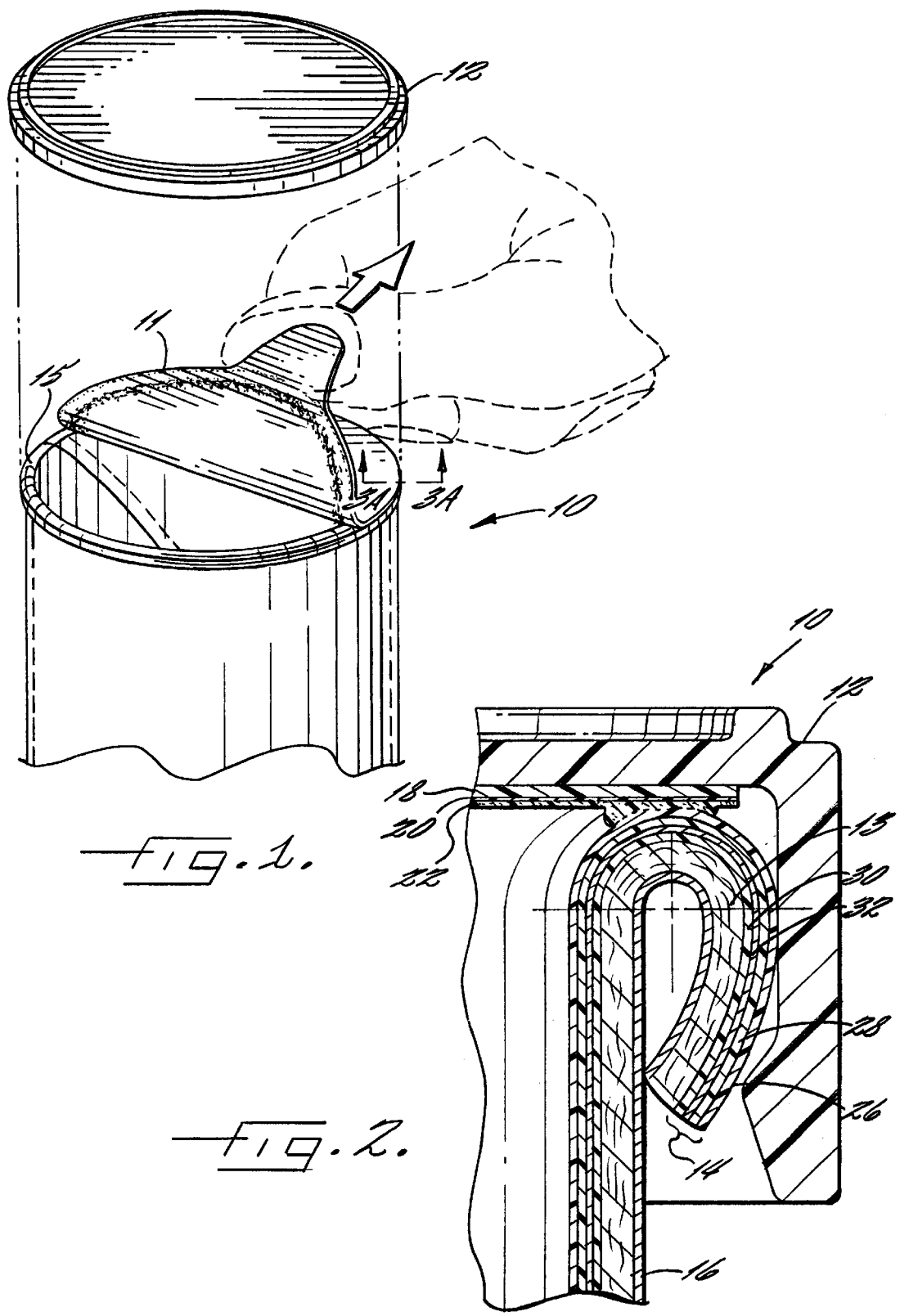

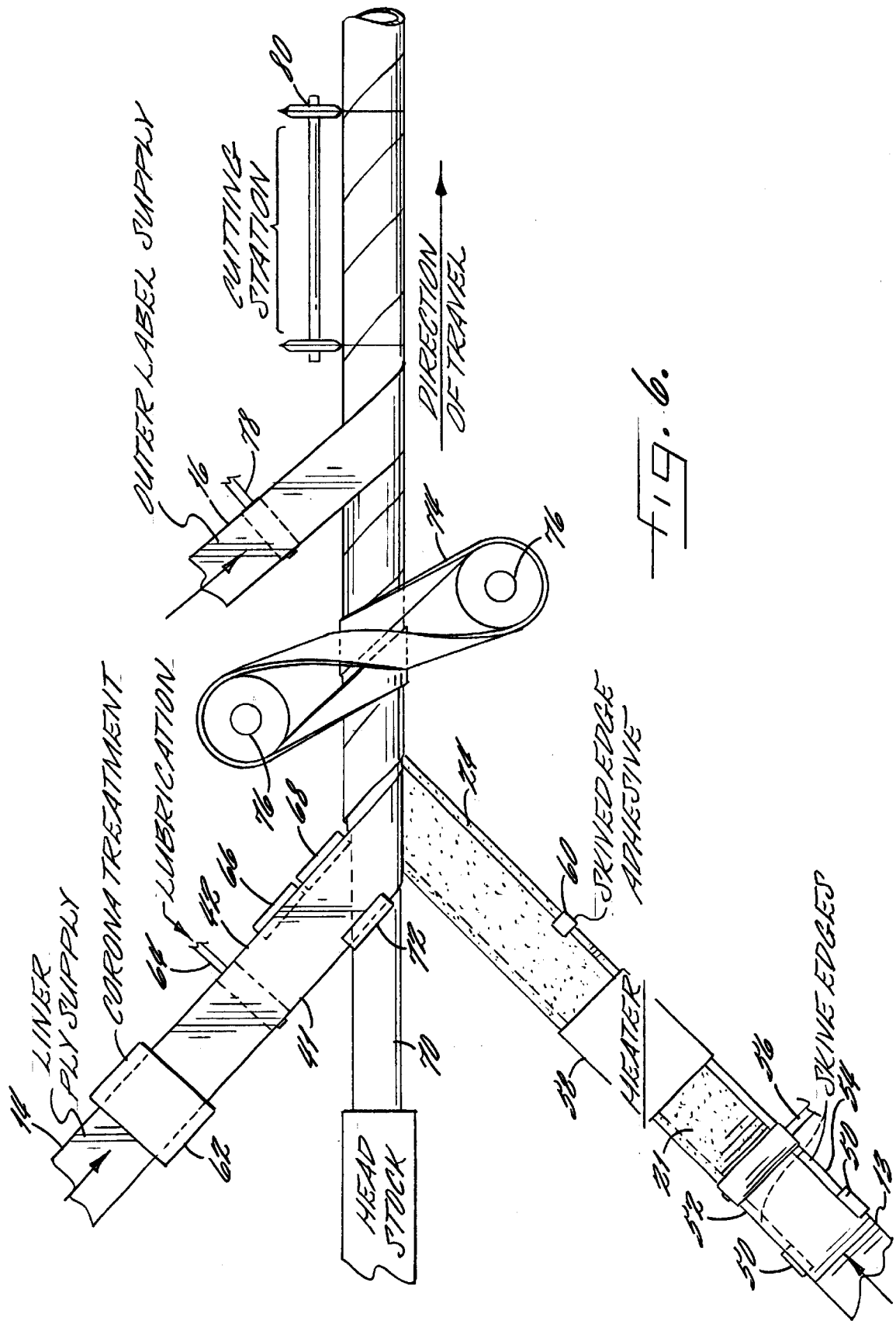

TUBULAR CONTAINER WITH A HEAT SEAL HAVING NON-SYMMETRICAL INNER AND OUTER BEADS

CROSS-REFERENCE TO RELATED APPLICATIONS

This application is a continuation-in-part of application Ser. No. 09/065,783, filed Apr. 23, 1998, now U.S. Pat. No. 5,979,748, which is incorporated herein by reference, and which is in turn a continuation-in-part of application Ser. No. 08/796,793 filed Feb. 6, 1997, now U.S. Pat. No. 5,829,669, which is also incorporated herein by reference.

FIELD OF THE INVENTION

The present invention relates to food containers and methods and apparatus for making food containers, and more particularly relates to heat seals used to seal such containers.

BACKGROUND OF THE INVENTION

Food and drink products and other perishable items are often packaged in tubular containers, which are sealed at both ends. These tubular containers typically include at least one structural body ply and are formed by wrapping a continuous strip of body ply material around a mandrel of a desired shape to create a tubular structure. The body ply strip may be spirally wound around the mandrel or passed through a series of forming elements so as to be wrapped in a convolute shape around the mandrel. At the downstream end of the mandrel, the tube is cut into discrete lengths and is then fitted with end closures to form the container.

Tubular containers of this type typically include a liner ply on the inner surface of the paperboard body ply. The liner ply prevents liquids, such as juice, from leaking out of the container and also prevents liquids from entering the container and possibly contaminating the food product contained therein. Preferably, the liner ply is also resistant to the passage of gasses, such as oxygen and nitrogen, so as to prevent odors of the food product in the container from escaping and to prevent atmospheric air from entering the container and spoiling the food product. Thus, the liner ply provides barrier properties and the body ply provides structural properties.

In addition, current commercial containers often have membrane-type lids or end closures heat sealed to a curled or bead-shaped rim of the composite container wall to form a peelable seal. The rim is formed by turning outwardly the end of the container to position the inner layer of the liner material on the outwardly curved surface.

A major difficulty in developing a usable heat seal between the container lid and the rim of the container wall is balancing bond strength with ease of opening for the end user. During transport, the sealed containers experience temperature and pressure extremes that stress the heat seal and can lead to rupturing of the container. The bond strength must be sufficient to withstand the rigors of transportation. In particular, when containers packaged and sealed at one elevation are then subjected to lower ambient air pressure, such as during air transportation or when transported to consumers at higher elevations, a relative positive pressure is created within the container which could cause the seal between the lid and the container to rupture. This ability of the container to avoid rupturing under such conditions is known as burst strength. However, as the burst strength increases, there is generally a concomitant increase in difficulty of opening of the container, which is exhibited by the peel strength or peel resistance of the container. The higher burst strength indiscriminately prevents both rupturing during transport and opening by the end user.

Certain types of heat sealable coatings have been used in both the lidding and liners of conventional containers. For example, SURLYN® polymer, a product of Dupont, is a material known in the art and is commonly used as a heat seal coating. SURLYN® polymer is an ionically cross-linked polymer with limited flow characteristics when heated. Typically, the layer of the container and the layer of the membrane which contact each other are constructed of SURLYN® polymer, and may be coated with a wax. These two layers of SURLYN® polymer are heat sealed along the top surface of the container bead. The two SURLYN® polymer layers create an extremely strong bond layer that remains relatively uniform in thickness across the seal area. Due to the strong cross-linked bond created by SURLYN® polymer, however, opening the container can require a peel force which is too high for some consumers and usually results in tearing and exposure of the other layers of the container wall, such as the paperboard body wall, as is illustrated in U.S. Pat. No. 4,280,653 to Elias. This gives the top of the container a ragged, undesirable appearance.

In the parent application, Ser. No. 09/065,783, the formation of two heat seal beads is described. The two beads comprise an inner heat seal bead and an outer heat seal bead, each heat seal bead being formed of the heat sealable polymers of the seal layers of the membrane and the liner. The two beads are formed by using heat and pressure to force the heat sealable polymers to flow away from the central portion of the heat seal area and towards the interior and exterior of the container. The reduction in the amount of heat seal material in the central heat seal area reduces the bond strength in the central heat seal area and allows opening of the container without unsightly tearing of the liner and exposure of the paperboard layer of the container wall. However, formation of the beads according to the parent application does not entirely erase the difficulty of balancing burst strength and ease of opening.

It would be advantageous to provide a sealed container and method for sealing a container that combine improved ease of opening and an attractive appearance after opening with the seal strength and barrier properties required for protection of the products within the container.

SUMMARY OF THE INVENTION

The composite container of the present invention successfully balances the need for ease of opening with the burst strength necessary to maintain a hermetic seal despite changes in pressure routinely experienced during transportation of the container. The present invention provides a sealed container having a larger heat seal bead on the interior side of the heat seal area than on the exterior side of the heat seal. The inner heat seal bead contains a greater amount of heat seal material and has a greater width than the outer heat seal bead. Since it had been discovered that the inner bead is primarily responsible for maintaining burst strength and the outer bead is primarily responsible for peel strength, a larger inner bead and smaller outer bead result in a good balance between burst strength and ease of opening.

In one embodiment, the present invention provides a sealed composite container for products having a tubular body member that includes at least one paperboard body ply. A liner ply is adhered to the inner surface of the tubular body member and includes a barrier layer and a seal layer. The seal layer defines the innermost surface of the liner ply and comprises a heat sealable composition. At least one end of the body member and liner ply is rolled outwardly to form a curled or bead-shaped rim exposing the seal layer. A lid for closing the end of the tubular body member is also provided. The lid has a barrier layer and a seal layer adjacent to the seal layer of the liner ply on the rim. The seal layer of the lid also comprises a heat sealable composition. The two seal layers are adhered together to form a heat seal between the lid and the liner ply. The heat seal comprises an inner bead formed of the heat sealable composition of the seal layers and facing the interior of the container and an outer bead also formed of the heat sealable compositions on the opposite side of the heat seal. The inner bead is larger than the outer bead, meaning that the inner bead comprises a larger amount of the heat seal compositions than the outer bead.

Specifically, the width of the inner bead is about 90 to about 190 microns, preferably about 130 to about 180 microns, and the width of the outer bead is about 60 to about 140 microns, preferably about 80 to about 120 microns. In terms of percentage, the width of the inner bead is about 10 to about 40% greater than the width of the outer bead, preferably about 20 to 30% greater. The heat seal further comprises an intermediate region between the two beads having a width of about 0 to about 30 microns.

The seal layer of the liner ply is preferably selected from the group consisting of high-density polyethylene, low-density polyethylene, metallocene catalyzed polyolefins, and mixtures thereof. The seal layer of the lid is preferably selected from the group consisting of ethylene vinyl acetate, high-density polyethylene, low-density polyethylene, ethylene methyl acrylate, metallocene catalyzed polyolefins, and mixtures thereof.

In one embodiment, the seal layer of the lid comprises about 10 lbs./3000 ft$^2$ to about 50 lbs./3000 ft$^2$ of the heat sealable composition, preferably at least about 20 lbs./3000 ft$^2$. Additionally, the seal layer of the lid has a thickness of about 0.6 to about 3.3 mils.

In the embodiment described above, both the liner ply and the lid include separate seal layers. However, the present invention does not require the use of two separate seal layers. At least one of said lid and said liner ply must have a seal layer comprising a heat sealable composition that forms a heat seal between the lid and the liner ply, but it is not necessary for both the liner ply and the lid to have seal layers.

In one embodiment, the rim of the container defines a heat seal surface, wherein the heat seal surface has an apex portion, an inner portion sloping away from the apex portion and toward the interior of the container, and an outer portion sloping away from the apex portion and toward the exterior of the container, the inner portion sloping away form the apex portion at a greater rate than the outer portion. This rim design causes the inner bead to extend further along the heat seal surface toward the interior of the container than the outer bead extends along said heat seal surface toward the exterior of the container.

A method of manufacturing tubular containers is also provided. The method includes providing a tubular member comprising at least one paperboard body ply having an inner surface and a liner ply adhered to the inner surface of the body ply, wherein the liner ply comprises a barrier layer and a seal layer. The seal layer defines the innermost surface of the liner ply and comprises a heat sealable composition. At least one end of the tubular container is rolled outwardly to form a rim exposing the seal layer of the liner ply. A lid is also provided closing the end of the tubular container, wherein the lid comprises a barrier layer and a seal layer. The seal layer of the lid comprises a heat sealable composition. The two seal layers are contacted together and heated under conditions that are sufficient to render the heat sealable compositions of the seal layers flowable. The seal layers are also pressed together to preferentially encourage flow of the heat sealable compositions in the direction of the interior of the container to form an inner bead and an outer bead of the heat sealable compositions, wherein the inner bead comprises a larger amount of the heat sealable compositions than the outer bead. In this manner, the lid is hermetically sealed to the liner ply.

Preferably, the pressing step comprises pressing the seal layers together with an inclined surface to preferentially encourage flow in the direction of the interior container. The heating step preferably comprises heating the seal layers to about 175° C. to about 275° C. The pressing step preferably comprises pressing the seal layers together for about 0.5 to about 1.75 seconds at a sealing pressure of about 30 to about 60 psi.

As described above, only one seal layer is required. If only one seal layer is used, the rim and lid are placed into contact and the seal layer is heated in order to render the heat sealable composition of the seal layer flowable. The rim and lid are pressed together to preferentially encourage flow in the direction of the interior of the container as described above.

An apparatus for sealing a lid to a container is also provided. The apparatus includes a sealing head having a central axis and a sealing surface, wherein at least a portion of the sealing surface is inclined towards the central axis of the sealing head. The sealing head has an engaged sealing position and a disengaged position. An actuator operatively connected to the sealing head moves the sealing head between the two positions. Preferably, the sealing surface is inclined at an angle from about 2° to about 20°, and most preferably at an angle of about 7° to about 12°.

BRIEF DESCRIPTION OF THE DRAWINGS

Some of the objects and advantages of the present invention having been stated, others will appear as the description proceeds when taken in conjunction with the accompanying drawings, which are not necessarily drawn to scale, wherein;

FIG. 1 is a fragmentary perspective view of a container of the present invention illustrating the opening mechanism whereby the liner ply is not torn through to the underlying paperboard;

FIG. 2 is a fragmentary and enlarged view of the sealed end of the tubular container of an embodiment of the present invention illustrating inner and outer beads of heat-sealable composition;

FIG. 6 is a plan view of an embodiment of an apparatus for making a tubular container according to the present invention.

DETAILED DESCRIPTION OF THE INVENTION

Figure 3A:
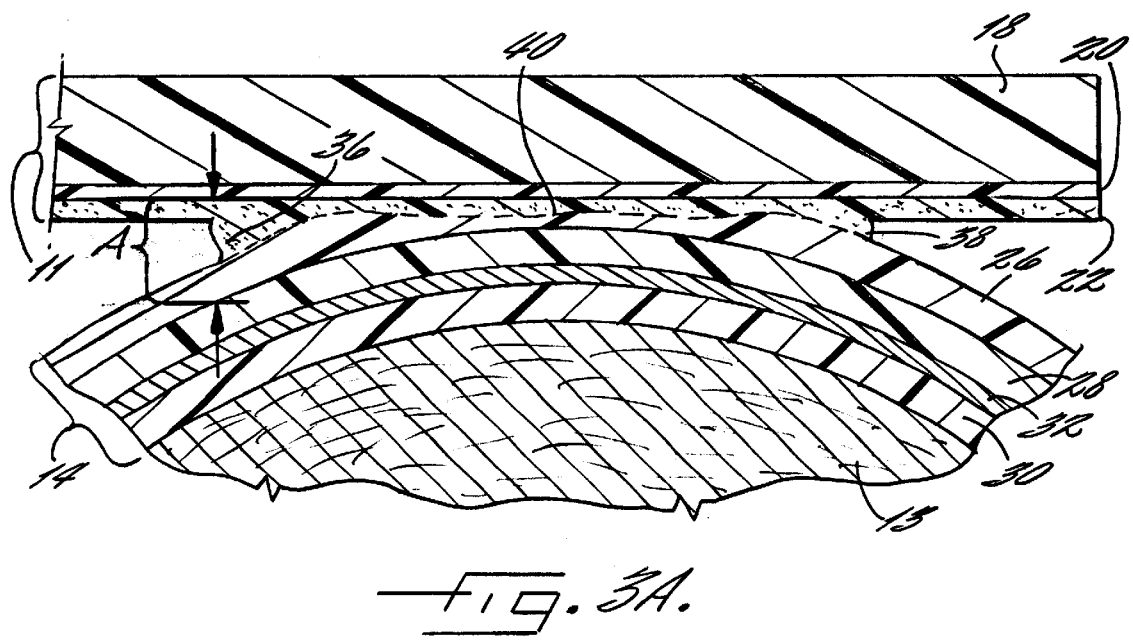
FIG. 3A is a greatly enlarged sectional view of the present invention taken along lines 3A—3A of FIG. 1.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A tubular container 10 according to the present invention is illustrated in FIG. 1. Although illustrated as having a circular cross section, the tube may have any cross sectional shape, which can be formed by wrapping the tube around an appropriately shaped mandrel. One example is a generally rectangular shaped tube having rounded corners.

The embodiment illustrated in FIG. 1 is particularly advantageous for packaging potato crisps and includes a flexible closure or lid 11, also referred to as a membrane-type closure or lid, and a reusable plastic end cap 12 over the seal. Various other end closures may be used; however, depending upon the type of food product that is to be packaged such as, for example, dough.

As illustrated in more detail in FIG. 2, the tubular container 10 includes a wall having a body ply 13 which is preferably formed of paperboard and a liner ply 14 which is preferably formed of a polymeric material adhered to the inner surface of the body ply 13. The upper end of the tubular container 10 is rolled over so as to form a bead-shaped rim 15. The lid 11 is hermetically sealed to the top of the rim 15 as discussed below. The end cap 12 is then snapped over the rim 15 and may be reused after the lid 11 has been removed. A closure (not illustrated), for example a metal closure, can be secured to the opposite end of the container 10.

The lid 11 is constructed of multiple layers. Optionally, the layer disposed on the outermost surface of the lid 11 away from the inside of the tubular container 10 is a paper or paperboard layer 18, such as a kraft paper layer. A barrier layer 20 is also provided that serves as a barrier to the passage of liquids and/or gasses such as oxygen. If a barrier is required for both liquids and gasses, the barrier material is preferably selected from the group consisting of polyethylene terephthalate, modified polyethylene terephthalate, polyethylene napthalate, metallized polyester or metallized polypropylene and mixtures thereof. The barrier layer 20 may also be constructed of metal oxide and silicate coated polyester, metal oxide and silicate coated polypropylene, ethylene vinyl alcohol and mixtures thereof. Alternatively, the barrier layer 20 comprises an aluminum foil layer.

Advantageously, the lid 11 further includes a seal layer 22 comprising a heat sealable composition and positioned such that the seal layer 22 of the lid 11 is adjacent to the seal layer 26 of the liner ply 14. The seal layer 22 of the lid 11 is preferably constructed of a material selected from the group consisting of ethylene vinyl acetate, high density polyethylene, low density polyethylene, ethylene methyl acrylate, metallocene catalyzed polyolefins and mixtures or blends thereof. The seal layer 22 of the lid 11 preferably has a melting point within the range of about 70° C. and 130° C. Most preferably, the melting point of the seal layer 22 is between about 80° C. and 110° C. and in particular is 83° C.

In one embodiment, the lid 11 is formed as a laminate having a paperboard layer 18 adhered to the barrier layer 20 using a coextruded adhesive layer (not shown). The adhesive layer is constructed of materials selected from the group consisting of low density polyethylene, ethylene methyl acrylate (EMA), ethylene-methacrylic acid copolymers (EMAA) and mixtures thereof. The seal layer 22 is coated on the opposing surface of the barrier layer 20. The seal layer 22 may be formed by extrusion coating, as a blown film laminated by extrusion or as a blown film laminated with a thermoset adhesive. In one embodiment, the seal layer 22 is formed as a dual layer coextrusion of high density polyethylene and ethylene methacrylate copolymer.

The seal layer 22 of the lid 11 is preferably between about 0.6 and about 3.0 mils in thickness, most preferably at least about 1.5 mils in thickness. The seal layer 22 comprises a heat sealable composition weight between about 10 to about 50 lbs./3000 ft$^2$ and preferably about 20 to about 40 lbs./3000 ft$^2$. Most preferably, the seal layer 22 has a heat sealable composition weight of about 25 lbs./3000 ft$^2$ or more. The relatively thicker seal layer 22 prevents natural variations in the container manufacturing process from affecting the consistency of the heat seal. For example, imperfections in the rim 15 and variations in the container height have a significant effect on the sealing process. The additional heat seal material fills any cracks and fissures created in the rim 15 and is also able to create a continuous seal around seams in the container wall, such as the seams created by anaconda folds or overlap seams in the liner. The additional seal material also contributes to better sealing by compensating for slight differences in container height that might otherwise lead to a reduction in seal strength. Further, the increased amounts of seal layer 22 material allow creation of a heat seal despite the presence of contaminants introduced into the heat seal area during the manufacturing process, such as wax. By using a thicker seal layer, the heat seal may be formed at lower sealing temperatures. A preferred construction of the seal layer is disclosed in U.S. patent application Ser. No. 09/416,194, filed concurrently herewith and entitled "Sealant Layer for Container Lid." This application is assigned to the assignee of the present application and is expressly incorporated herein by reference.

The liner ply 14 is also typically constructed of multiple layers. With the exception of the outermost seal layer 26, the composition of the liner ply 14 is not critical to the present invention. Preferably, one of the layers forms a barrier to moisture and/or gasses, depending on the application. It will be understood that various barrier materials and liner plies could be employed depending upon the item being packaged. For example, conventional liners include a layer of foil backed with kraft paper. However, in a preferred embodiment, the liner ply 14 is substantially entirely formed of polymeric material. In particular, liner plies such as described in U.S. Pat. No. 5,829,669 to Drummond et al. or U.S. Pat. No. 5,846,619 to Cahill et al. both of which are assigned to the assignee of the present invention and are hereby incorporated by reference, may be used.

In the embodiment illustrated in FIG. 2, the liner ply 14 includes a seal layer 26, a moisture barrier layer 28 and an adhesive layer 30. The barrier layer 28 is resistant to the passage of liquids and gasses such as oxygen. If a high barrier is required for both liquids and gasses, preferred barrier materials are metallized polyester or metallized polypropylene. Some food products, such as juices, do not require a gas barrier and other barrier materials may be used (although the barrier may also be generally resistant to the passage of gasses). It will be understood that various barrier materials could be employed depending upon the item being packaged. Alternative barrier materials include nylon, EVOH (ethylene vinyl alcohol polymer and copolymer), polyvinylidene chloride, polyethylene, polypropylene, metallized polypropylene, metal oxide and silicate coated polyester, metal oxide and silicate coated polypropylene and the like as will be apparent to the skilled artisan.

One surface of the barrier layer 28 may include a thin metallized coating 32 to provide a metallic appearance and also to enhance the barrier properties. The metallized coating 32, which may be formed of aluminum, is significantly thinner than a foil layer, however, and is not necessary for strength or barrier properties in certain applications.

An adhesive layer 30 is preferably below the metallized coating 32 and defines the radially outermost surface of the liner ply 14. The adhesive layer 30 may have multiple layers coextruded together. The adhesive layer 30 may be selected from the group consisting of metallocene catalyzed polyolefins, ethylene-methacrylic acid, ethylene methyl acrylate, ethylene butyl acrylate, ethylene acrylic acid, ethylene vinyl acetate, and blends, mixtures and copolymers thereof. The adhesive layer 30 may also be a thermoset adhesive layer.

A seal layer 26 defines the radially innermost surface of the liner ply 14. The seal layer 26 provides a surface against which the adhesive layer 30 is adhered when a first marginal edge portion 41 of the liner ply 14 is brought into an overlapping relationship with a second marginal edge portion 42, as shown in FIG. 6. The seal layer 26 also forms the heat seal between the lid 11 and the liner 14 in conjunction with the seal layer 22 of the lid.

The seal layer 26 of the liner ply 14 is preferably constructed of a material selected from the group consisting of high density polyethylene, low density polyethylene, metallocene catalyzed polyolefins and mixtures or blends thereof. In embodiments of the seal layer 26 including a polyolefin polymer, the polyolefin is preferably high density polyethylene or a high density polyethylene blend containing up to 30% low density polyethylene. The seal layer 26 of the liner ply 14 preferably has a melting point within the range of about 110° C. and about 140° C. Most preferably, the seal layer 26 has a melting point between about 120° C. and 130° C.

FIG. 2 illustrates the sealed end of the tubular container of a preferred embodiment of the present invention wherein the two seal layers, 22, 26 are heat sealed together. As shown in greater detail in FIG. 3A, a sealed composite container for products is provided having a heat seal between the liner ply 14 and the lid 11 in the form of an inner heat seal bead 36 and an outer heat seal bead 38. The inner heat seal bead 36 and the outer heat seal bead 38 are formed of the heat sealable compositions of the seal layer 26 of the liner ply 14 and the seal layer 22 of the lid 11. The heat sealable compositions of both seal layers 22, 26 are displaced outwardly from the intermediate region during the heat sealing operation and are cooled to form the beads 36, 38. The inner heat seal bead 36 faces the interior of the tubular container 10 and the outer heat seal bead 38 is disposed on the opposite side of the heat seal area from the inner heat seal bead 36. When cooled, the heat seal comprises a thin intermediate region 40 between the inner heat seal bead 36 and the outer heat seal bead 38. In certain places, the heat sealable compositions may be completely displaced from between the barrier layers 20 and 28 such that the barrier layers are in abutting contact. However, the inner and outer beads 36, 38 maintain double barriers against the passage of liquids and gasses so that a hermetic seal is maintained. The intermediate region 40 preferably has a lower bond strength than the inner heat seal bead 36 and the outer heat seal bead 38. The width of the intermediate region 40 is about 0 to about 30 microns. The term "bead" as used herein is intended to be distinguished from prior containers having relatively flat heat seal where very little, if any, flowing of the heat seal compositions occurs. In addition, this embodiment is not limited to use with only liners having a straight overlapping seam, but the heat seal beads 36, 38 could also be used with an anaconda fold seam.

In effect, the inner heat seal bead 36 and the outer heat seal bead 38 provide a double seal having a high tensile or burst strength. The burst strength of the bead seals gives the container 10 a strong seal against forces acting upon the container in a direction normal to the heat seal (i.e., normal to the plane defined by the end of the tubular container 10). Since most forces acting upon a container during storage and transit will occur normal to the heat seal area, the high burst strength of the inner heat seal bead 36 and outer heat seal bead 38 of the present invention is especially advantageous for use with product containers. Burst strength may be tested using an altitude chamber. Typically, the sealed container 10 is placed in the altitude chamber and then subjected to an external partial vacuum for a predetermined period of time to determine whether the heat seal is capable of withstanding differences between interior container pressure and external air pressure. Suitable testing conditions include subjecting the container to a vacuum of 10 in. of Hg for 30 minutes at room temperature. The containers 10 of the present invention are capable of maintaining a hermetic seal during a thirty minute exposure to a vacuum of 10 in. of Hg at room temperature.

Notwithstanding the high burst strength, the peel strength of the heat seal formed according to the present invention is relatively low, resulting in a container that exhibits relative ease of opening. This is in contrast to conventional containers where two SURLYN® polymers are ionically crosslinked together in a relatively flat heat seal, resulting in a bond, which is sufficient to tear the liner 14 when removing the lid 11 (rather than tearing through the SURLYN® polymer). The preferred range for peel strength is about 5 to about 10 lbs./linear inch. In one embodiment, the heat seal has a peel strength of about 7 to about 10 lbs./linear inch. Thus, the heat seal of the present invention combines the shear strength and tensile strength necessary to prevent unwanted breaches of the tubular container 10 with relatively low peel strength for ease of opening by the consumer.

Figure 3B:
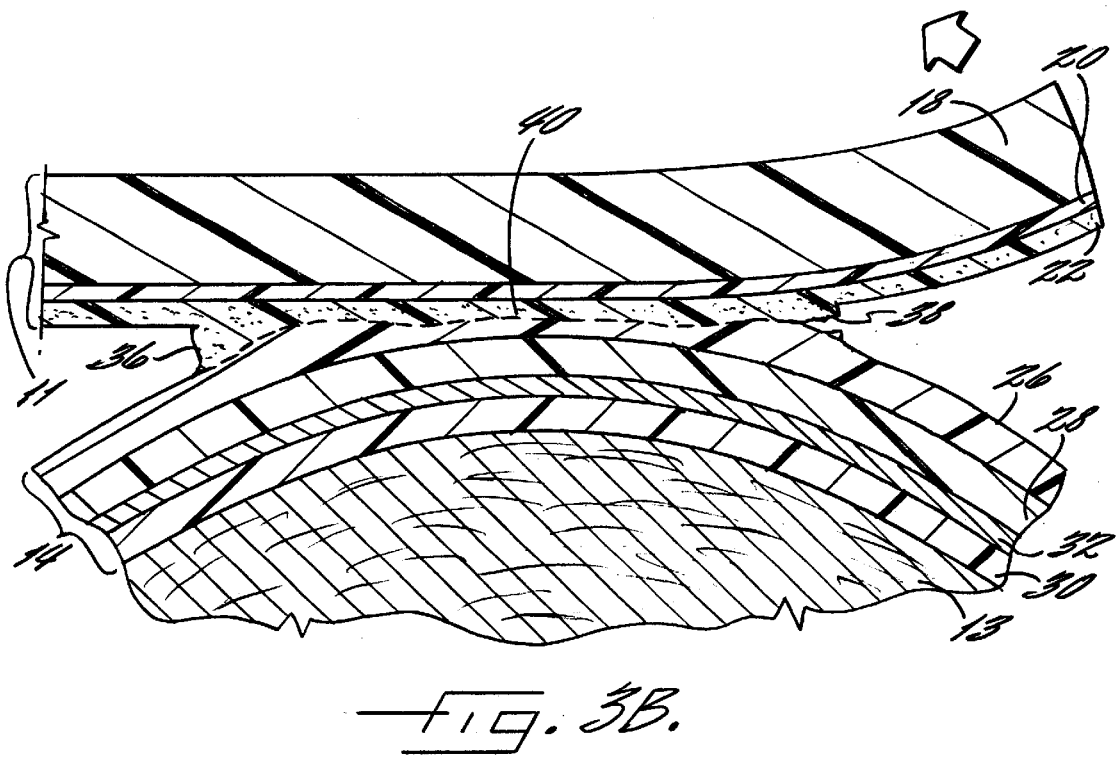
FIG. 3B is a greatly enlarged sectional view of the heat seal of the present invention illustrating the initiation of a tear in the seal layers during the opening of the container.
Figure 3C:
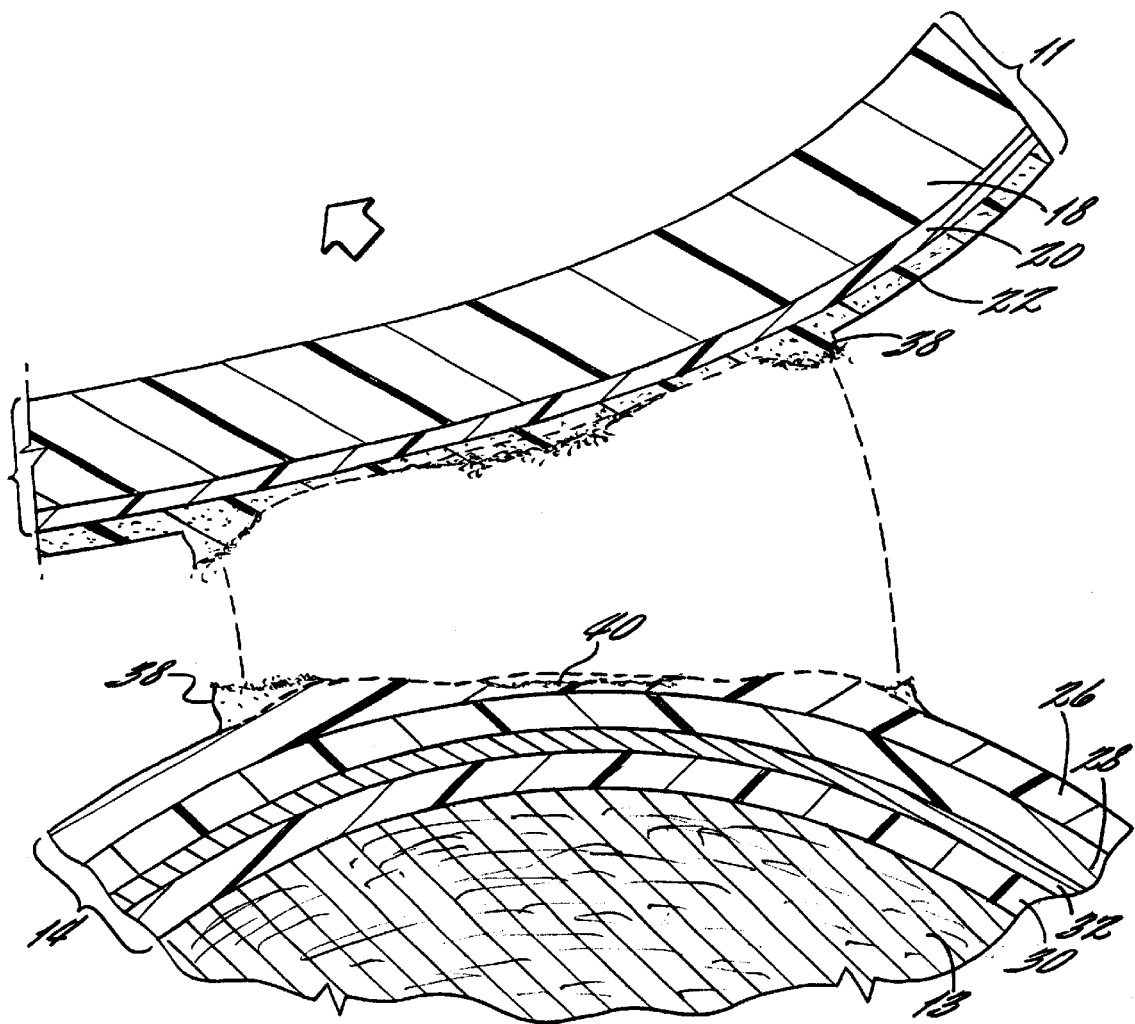
FIG. 3C is a greatly enlarged sectional view of the heat seal of the present invention after the container has been opened.

FIGS. 3A–3C illustrate the opening mechanism for container 10 of the present invention. As shown by FIGS. 3B and 3C, the shearing force generated during opening of the container 10 causes a tear to propagate through the seal layer 26 of the liner ply 14 and/or the seal layer 22 of the lid 11. The seal layer 26 of the liner ply 14 and the seal layer 22 of the lid 11 provide a bond strength between the barrier layer 20 of the lid 11 and the barrier layer 28 of the liner ply 14 that is lower than the bond strength between the barrier layer 28 of the liner ply 14 and the paperboard body ply 13 (or any other intermediate layers such as the metallized coating 32 of the liner 14). As a result, shearing that takes place during the opening of the tubular container 10 occurs only between, and not through, the barrier layers of the liner ply 14 and lid 11. When the tubular container 10 of the present invention is opened, unsightly tears through the barrier layer 28 of the liner ply 14 do not occur.

It has been discovered that the inner bead 36 of the double bead seal provides the primary resistance to tensile forces acting upon the container, such as those burst forces generated by changes in internal pressure during transport. However, the outer bead 38 provides the primary resistance to opening by peeling of the peelable heat seal formed between the lid 11 and the liner ply 14. As a result, it has been discovered that the heat seal is advantageously formed having a larger inner bead 36 and a smaller outer bead 38. The resulting container exhibits both improved ease of opening by virtue of the smaller outer bead 38 and improved burst strength for withstanding the rigors of transportation by virtue of the larger inner bead 36.

The heat seal of the present invention has an inner bead 36 having a greater width than the outer bead 38. Bead width is defined as the distance between the barrier layer 20 of the lid 11 and the barrier layer 28 of the liner ply 14 measured at the longest point across the bead in the vertical plane as shown by reference symbol A of FIG. 3A. Note that the width measurement is generically defined as the distance between the next adjacent layer to the seal layer 22 of the lid 11 in the construction of the lid and the next adjacent layer to the seal layer 26 of the liner 14 in the construction of the liner. In the preferred embodiment, the next adjacent layers are the barrier layers. However, in other embodiments, the next adjacent layers may be layers of other types. Specifically, the width of the inner bead 36 is about 90 to about 190 microns, preferably about 130 to about 180 microns, and most preferably about 140 to about 160 microns. The width of the outer bead 38 is about 60 to about 140 microns, preferably about 80 to about 120 microns, and most preferably about 95 to about 120 microns. As will be understood, the width of the beads will depend on a number of factors, including the heat sealable materials used to form the seal layers 22, 26, the heat sealing conditions and the like.

In terms of relative widths of the inner bead 36 and outer bead 38, the width of the inner bead is about 10 to about 40% greater than the width of the outer bead, preferably about 20 to 30% greater, and most preferably about 22 to about 26% greater.

Figure 4:
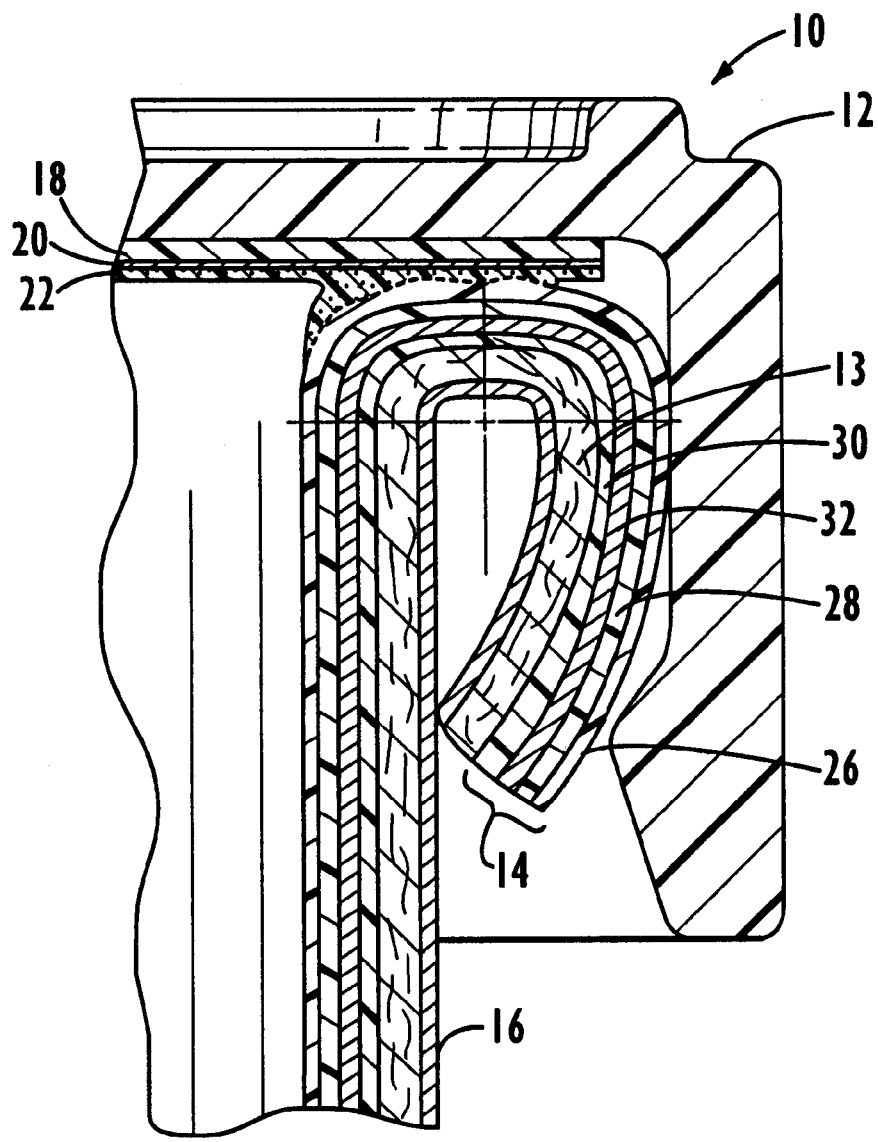
FIG. 4 is a fragmentary and enlarged view of the sealed end of the tubular container of an embodiment of the present invention illustrating a preferred shape of the rim of the container.

A preferred shape of the rim 15 of the container 10 is illustrated in FIG. 4. As shown, the rim 15 of the container 10 is rolled outwardly to expose the heat seal layer 26 of the liner 14. The rim 15 creates a heat seal surface that contacts the seal layer 22 of the lid 11. The heat seal surface includes an apex portion 84, an inner portion 86 sloping away from the apex portion and toward the interior of the container 10, and an outer portion 88 sloping away from the apex portion and toward the exterior of the container. Preferably, the inner portion 86 slopes away from the apex portion 84 at a greater rate than the outer portion 88. This rim 15 design encourages the inner bead 36 to extend further down the heat seal surface toward the interior of the container 10 and discourages the outer bead 38 from extending down the heat seal surface toward the exterior of the container. In this manner, the shape of the rim 15 affects the direction of flow of the heat sealable compositions and the relative shapes of the inner bead 36 and outer bead 38. By encouraging flow of the heat sealable compositions further down the heat seal surface toward the interior of the container, better burst strength is obtained due to the anchoring effect of the inner bead 36. It is believed that the shape of the inner bead 36 creates a shear component of resistance which counters the forces caused by internal container pressure more effectively than the more tensile resistance of prior art designs. Additionally, peel strength is maintained at a reasonable level because the incline or slope of the heat seal surface toward the exterior of the can is lesser in degree and does not encourage flow of the heat sealable compositions in that direction. As desired, the above-described shape of the rim 15 maintains the outer bead 38 at a relatively smaller size as compared to the inner bead 36. The desired rim 15 shape can be formed during the initial formation of the container rim or by a secondary forming process. Alternatively, the desired rim 15 shape may be formed in conjunction with the heat sealing operation. The rim can also have a substantially planar portion as shown in FIG. 4 and disclosed in U.S. patent application Ser. No. 09/416,169, filed concurrently herewith and entitled "Container With Heat Seal Surface Having a Substantially Planar Portion." This application is assigned to the assignee of the present application and is expressly incorporated herein by reference.

Figure 5A:
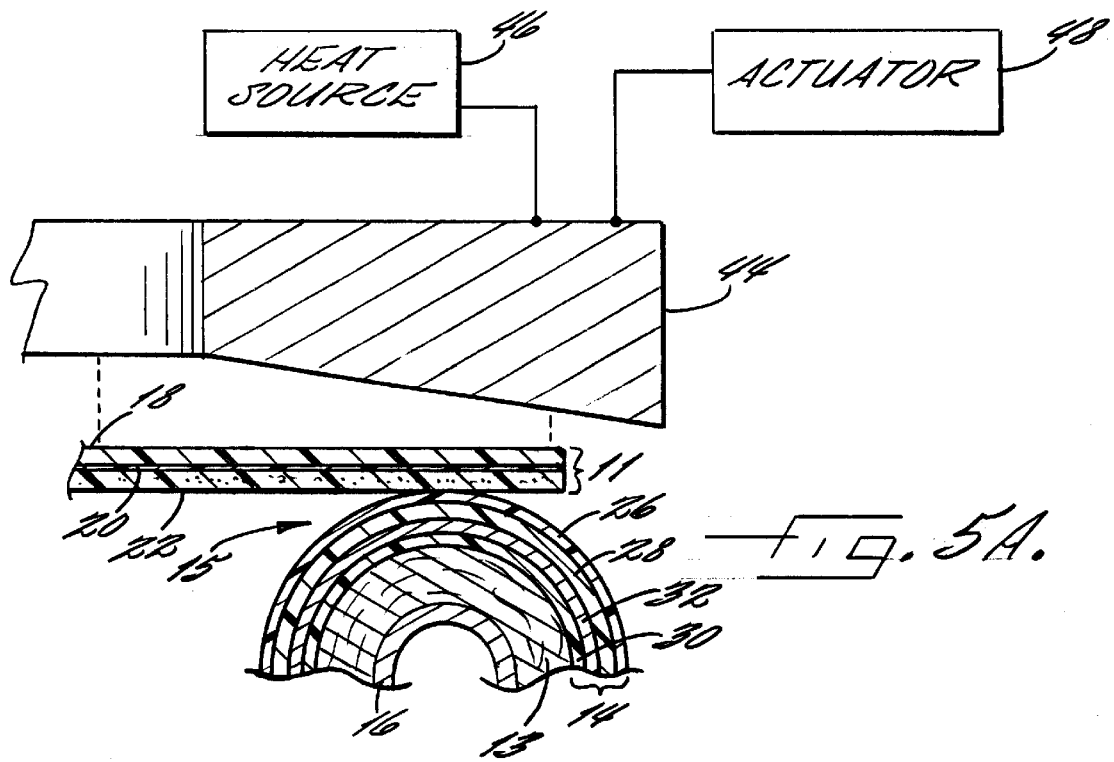
FIG. 5A is an enlarged sectional view of the heat-sealing apparatus of the present invention prior to contact with the container of the present invention.
Figure 5B:
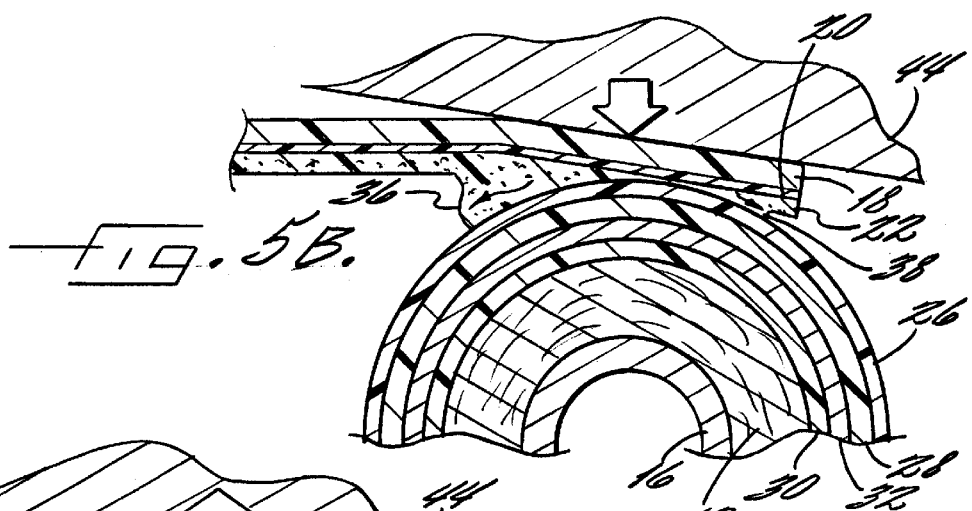
FIG. 5B is an enlarged sectional view of one embodiment of the sealing head of the heat sealing apparatus of the present invention contacting the lid of the container and forcing the heat sealable compositions preferentially towards the interior of the container.
Figure 5C:
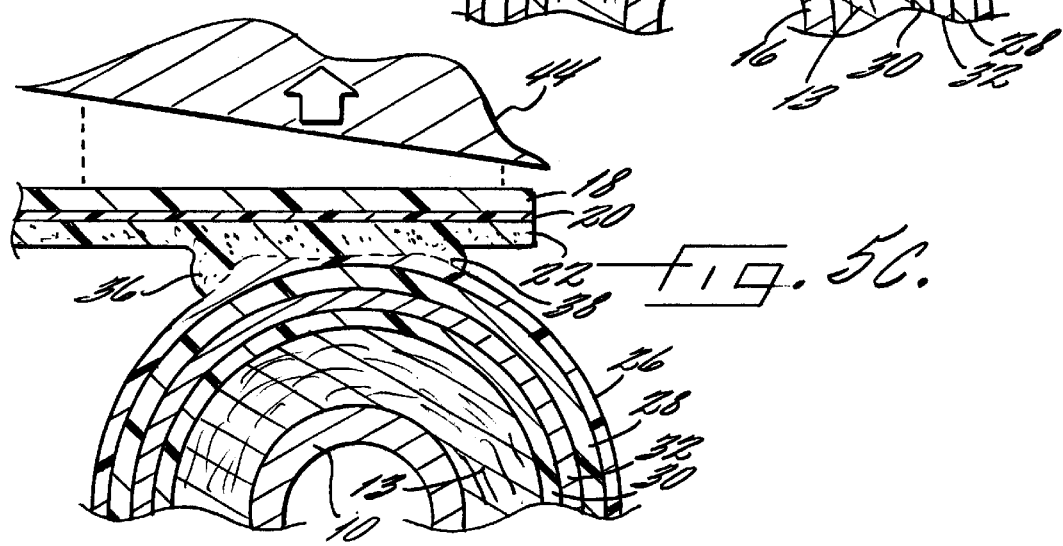
FIG. 5C is an enlarged sectional view of the sealed end of a container of the present invention after the sealing operation.

A method and apparatus for sealing a container for products is also provided. The sealing method and apparatus are illustrated in FIGS. 5A–5C. The heat seal may be created using any suitable apparatus known in the art. In some sealing systems, wax is applied to the rim 15 to hold the lid 11 in place prior to formation of the heat seal. As noted above, the relatively thick seal layer 22 of the lid 11 allows the formation of a heat seal having sufficient bond strength despite the presence of wax in the heat seal area. The present invention is also compatible with sealing systems that utilize a vacuum system to initially hold the lid 11 in place prior to the heat sealing operation.

Using either apparatus, the heat sealing method of the present invention includes providing a tubular member having a paperboard layer 13 and liner ply 14 adhered to the inner surface of the paperboard layer. As described above, the liner ply 14 includes a barrier layer 28 and a seal layer 26, the seal layer defining the innermost surface of the liner ply and comprising a heat sealable composition. Once an end of the tubular member is rolled outwardly to form a rim 15, a lid 11 may be contacted with the liner ply 14 for forming the heat seal. The lid 11 includes a barrier layer 20 and a seal layer 22, wherein the seal layer comprises a heat sealable composition. The seal layer 22 of the lid 11 is contacted with the seal layer 26 of the liner ply 14. The two seal layers 22, 26 are then heated under conditions sufficient to render the heat sealable compositions flowable and pressed together so as to preferentially encourage more flow of the heat sealable compositions in the direction of the interior of the container to form an inner bead 36 and an outer bead 38, wherein the inner bead contains a larger amount of heat sealable compositions than the outer bead.

In a preferred embodiment, the pressing step is accomplished by pressing the seal layers 22, 26 together using an inclined surface, such as inclined heat sealing head 44. The heat sealing head 44 is preferably constructed of metal, such as aluminum, coated copper or other heat conductive material. The heat sealing head 44 is heated by heat source 46. The heat source may be any suitable type of heat source known in the art. The heat sealing head 44 does not have to be heated. The heat seal layers 22, 26 could be heated independently using a separate heat source. The heat sealing head 44 has an engaged sealing position in contact with the lid 11 and a disengaged position. The heat sealing head 44 is moved between the two positions by an actuator 48. The actuator 48 may be any type of actuator known in the art, including mechanical, pneumatic, and the like.

The angle of the inclined surface of the heat sealing head 44 affects the amount of material that flows to form the beads as well as the relative size of the beads. The angle of the inclined surface of the heat sealing head 44 is about 2 to about 20 degrees, preferably about 7 to about 12 degrees. In one embodiment, the angle of the inclined surface is about 10 degrees. In another embodiment, the angle is about 3°. The inclined surface of the head 44 causes molten polymer from the seal layers to move towards the interior of the container to form the inner bead. As this movement occurs, the molten polymer advantageously "fills in" any irregularities in the liner and lid surfaces, thus improving the integrity of the seal.

The heat sealing conditions, such as temperature, pressure, and time, depend on a number of factors, including the heat sealable compositions used and the thickness of the heat seal layers. In one embodiment, the heat seal layers are heated to between about 175° C. to about 275° C., preferably about 205° C. to about 230° C., and most preferably about 210° C. to about 225° C. In one embodiment, the heat sealing temperature is about 218° C. The heat sealing pressure is about 30 to about 60 psi, preferably about 40 to about 50 psi. In one embodiment, the heat sealing pressure is about 45 psi. The heat sealing time, meaning the period of time during which heat sealing pressure is applied, is about 0.5 to about 1.75 seconds, preferably about 0.9 to about 1.5 seconds, and most preferably about 1.15 to about 1.35 seconds. In one embodiment, the heat sealing time is about 1.25 seconds.

Although the container embodiments discussed above include two seal layers, 22 and 26, the present invention does not require the use of two seal layers. At least one of the liner and lid must include a seal layer in order to provide the necessary heat seal beads, 36 and 38, as described above. However, two seal layers are not necessary to practice the present invention. If a single heat seal layer is used, the heat seal layer may be constructed of high density polyethylene, low density polyethylene, ethylene vinyl acetate, ethylene methyl acrylate, metallocene catalyzed polyolefins and mixtures thereof.

The containers 10 of the present invention may be manufactured by the process illustrated in FIG. 6. As shown, a continuous strip of paperboard body ply material 13 is supplied to the apparatus and is first passed through a pair of opposed edge skivers 50. The edge skivers remove part of the square edge of the body ply 13 to create first 52 and second 54 edges having a beveled configuration. The body ply 13 is then advanced through an adhesive applicator 56, which applies an adhesive 21 to the upper surface of the body ply 13. The adhesive 21 is advantageously an aqueous adhesive, which overcomes the many problems associated with solvent based adhesives. No special equipment is needed to capture solvents, which evaporate from the adhesive in order to comply with environmental regulations. Preferred adhesives are aqueous low glass transition temperature ethylene vinyl acetate (>18%) materials. One preferred adhesive is No. 72-4172, which is available from the National Starch and Chemical Company. Another adhesive that may be used is No. 33-4060, which is also available from the National Starch and Chemical Company. The adhesive 21, as well as other adhesive layers used to construct the container 10, may be applied in the form of a foam as described in copending U.S. patent application Ser. No. 09/197,275 entitled, "Composite Container Having Foamed Adhesive," which is assigned to the assignee of the present invention and hereby incorporated by reference.

The body ply 13 and wet adhesive 21 applied thereto are then passed underneath a heater 58 which evaporates at least part of the water content of the aqueous adhesive 21 to render the adhesive substantially tacky. It is important that the correct amount of heat is supplied to the adhesive. Insufficient heat will not evaporate enough water in a sufficiently short period of time with the result that the adhesive will not be rendered sufficiently tacky. Conversely, too much heat will overdry the adhesive and cause the adhesive to lose tackiness. A preferred type of heat source is an infrared heater although various other heat sources, e.g., forced air heating or the like can be used. After heating the adhesive 21 on the body ply 13, the body ply 13 and the liner ply 14 are fed to the shaping mandrel from opposite directions. The body ply 13 is passed under skive adhesive applicator 60 which applies the skive adhesive 24 to the beveled surface of the skived second edge 54 of the body ply 13. The skive adhesive 24 is preferably a hot melt adhesive of the type which is conventional in the art, although it could also be a water based adhesive including one or more polymers. Polyvinyl acetate and ethylene vinyl acetate are the preferred liquid adhesives. The skive adhesive 24 helps provide a stronger body ply bond especially for single body ply containers.

The surface of the liner ply 14 that contacts the body ply 13 is subjected to a corona treatment station 62. The opposite surface of liner ply 14 is coated with lubricant from a roller 64, which allows the liner ply to slide smoothly during the winding operation.

The liner ply 14 is then passed under an infrared heater 66, which heats the second marginal edge portion 42 of the liner ply. After the infrared heater 66, the second marginal edge portion 42 of the liner ply 14 is then passed under at least one forced air heater 68.

The body ply 13 and the liner ply 14 are then wrapped around a shaping mandrel 70 from opposite sides of the mandrel. Each ply is first wrapped under the mandrel 70 and then back over the top in a helical fashion with the liner ply 14 wound against the surface of the mandrel. The first marginal edge portion 41 of the liner ply 14 is exposed on the mandrel 70 and is subjected to heat from a second forced air heater 72.

As the body ply 13 is further wrapped and the first edge 52 of the body ply 13 advances back under the mandrel 70 after one complete revolution, it is brought into contact with the second edge 54 of the ensuing portion of the body ply 13 which is first coming into contact with the mandrel. The skived edges 52, 54 become abutted together and the skive adhesive 24 adheres the edges together to form a spirally wound tube which advances along the mandrel 70.

With regard to the liner ply 14, the first marginal edge portion 41 is brought into an overlapping relationship with the second marginal edge portion 42 to create a sealed straight lap seam. The seal is formed by a polymeric adhesive layer 30 of the first marginal edge 41 becoming bonded to the second marginal edge 42. However, a strip of hot melt adhesive could alternatively be used for securing and sealing the liner overlap.

The tube is then advanced down the mandrel 70 by a conventional winding belt 74, which extends around a pair of opposed pulleys 76. The winding belt 74 not only rotates and advances the tube, but also applies pressure to the overlapping edges of the body ply 13 and liner ply 14 to ensure a secure bond between the respective ply edges.

An outer label ply 16 is then preferably passed over an adhesive applicator 78 and wrapped around the body ply 13. The label ply 16 could be applied before the winding belt 74. At a cutting station 80, the continuous tube is cut into discrete lengths and removed from the mandrel 70.

The ends of the containers 10 are then rolled outwardly to form the rim 15 and the lid 11 is subsequently heat sealed thereto as described above. An end closure, such as a metal closure, is attached to the other end of the container 10. Typically, the lid 11 and end closure 12 are applied to one end of the container 10 prior to filling of the container. After filling, an end closure is applied to the opposing end.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. For example, the tubular containers according to the present invention are not necessarily helically wound but may instead be longitudinally wrapped to create a "convolute" tube having an axially extending seam. In addition, although the tubular containers according to the present invention have been described primarily in connection with food products, it is to be understood that the containers could be used in connection with other products where the liner ply is advantageous such as, for example, ink or caulk. Although specific terms are employed herein, they are used in a generic and descriptive sense only and not for purposes of limitation.

That which is claimed:

1. A sealed composite container for products comprising:
a tubular body member comprising at least one paperboard body ply and having an inner surface;
a liner ply adhered to the inner surface of said tubular body member and comprising a barrier layer, at least one end of said body member and said liner ply being rolled outwardly to form a rim and exposing said liner ply; and
a lid operatively positioned adjacent to said rim and heat sealed thereto, said lid comprising a barrier layer;
wherein at least one of said lid and said liner ply further comprises a seal layer comprising a heat sealable composition, said seal layer forming a heat seal between said lid and said liner ply comprising an inner bead formed of the heat sealable composition and facing the interior of the container and an outer bead formed of the heat sealable composition on the opposite side of the heat seal from the inner bead, wherein said inner bead comprises a larger amount of the heat sealable compositions in cross section than said outer bead.

2. A container according to claim 1, wherein the width of the inner bead is about 90 to about 190 microns and the width of the outer bead is about 60 to about 140 microns.

3. A container according to claim 2, wherein the width of the inner bead is about 130 to about 180 microns and the width of the outer bead is about 80 to about 120 microns.

4. A container according to claim 1, wherein the width of said inner bead is about 10 to about 40% greater than the width of said outer bead.

5. A container according to claim 4, wherein the width of said inner bead is about 20 to about 30% greater than the width of said outer bead.

6. A container according to claim 1, wherein said heat seal further comprises an intermediate region between said inner and outer beads, said intermediate region having a width of about 0 to about 30 microns.

7. A container according to claim 1, wherein said heat seal provides a bond strength between said barrier layer of said lid and said barrier layer of said liner ply, said bond strength being less than the bond strength between said barrier layer of said liner ply and said tubular body member behind said barrier layer such that, upon opening, shearing occurs only between the barrier layers.

8. A container according to claim 1, wherein said seal layer is selected from the group consisting of high density polyethylene, low density polyethylene, ethylene vinyl acetate, ethylene methyl acrylate, metallocene catalyzed polyolefins and mixtures thereof.

9. A container according to claim 1, wherein said heat seal has sufficient burst strength to maintain a hermetic seal when exposed to a vacuum of 10 in. of Hg at room temperature for thirty minutes.

10. A container according to claim 1, wherein both of said lid and said liner ply comprise a seal layer.

11. A container according to claim 10, wherein said seal layer of said lid has a lower melting point than said seal layer of said liner ply.

12. A container according to claim 10, wherein the melting point of said seal layer of said lid is between about 70° C. to about 130° C. and the melting point of said seal layer of said liner is between about 110° C. to about 140° C.

13. A container according to claim 12, wherein the melting point of said seal layer of said lid is between about 80° C. to about 110° C. and the melting point of said seal layer of said liner is between about 120° C. to about 130° C.

14. A container according to claim 10, wherein said heat seal provides a bond strength between said barrier layer of said lid and said barrier layer of said liner ply, said bond strength being less than the bond strength between said barrier layer of said liner ply and said tubular body member behind said barrier layer such that, upon opening, shearing occurs only between the barrier layers.

15. A container according to claim 1, wherein said heat seal has a peel strength of about 5 to about 10 lbs./linear inch when the heat seal is pulled at a 135 to 180 degree angle from the plane of the top of the container.

16. A container according to claim 10, wherein said seal layer of said liner ply is selected from the group consisting of high density polyethylene, low density polyethylene, metallocene catalyzed polyolefins, and mixtures thereof.

17. A container according to claim 10, wherein said seal layer of said lid is selected from the group consisting of ethylene vinyl acetate, high density polyethylene, low density polyethylene, ethylene methyl acrylate, metallocene catalyzed polyolefins and mixtures thereof.

18. A container according to claim 1, wherein said barrier layer of said lid is selected from the group consisting of polyethylene terephthalate, modified polyethylene terephthalate, metallized polyethylene terephthalate, metallized modified polyethylene terephthalate, polyethylene napthalate, metallized polyethylene napthalate, metallized polypropylene, metal oxide and silicate coated polyester, metal oxide and silicate coated polypropylene, ethylene vinyl alcohol and mixtures thereof.

19. A container according to claim 1, wherein said barrier layer of said liner ply is selected from the group consisting of polyethylene terephthalate, modified polyethylene terephthalate, metallized polyethylene terephthalate, metallized modified polyethylene terephthalate, polyethylene napthalate, metallized polyethylene napthalate, metallized polypropylene, metal oxide and silicate coated polyester, metal oxide and silicate coated polypropylene, ethylene vinyl alcohol and mixtures thereof.

20. A container according to claim 1, wherein said lid comprises a seal layer having about 10 lbs./3000 ft$^2$ to about 50 lbs./3000 ft$^2$ of a heat sealable composition.

21. A container according to claim 20, wherein said seal layer of said lid comprises at least about 20 lbs./3000 ft$^2$ of a heat sealable composition.

22. A container according to claim 1, wherein said lid comprises a seal layer having a thickness of about 0.6 to about 3.3 mils.

23. A container according to claim 22, wherein said seal layer of said lid has a thickness of at least about 1.5 mils.

24. A sealed composite container for products comprising:

a tubular body member comprising at least one paperboard body ply and having an inner surface;

a liner ply adhered to the inner surface of said tubular body member and comprising a barrier layer, at least one end of said body member and said liner ply being rolled outwardly to form a rim, said rim defining a heat seal surface having an apex portion, an inner portion sloping away from said apex portion and toward the interior of the container, and an outer portion sloping away from said apex portion and toward the exterior of the container, the inner portion sloping away from the apex portion at a greater rate than the outer portion; and a lid operatively positioned adjacent to said rim and heat sealed thereto, said lid comprising a barrier layer;

wherein at least one of said lid and said liner ply further comprises a seal layer comprising a heat sealable composition, said seal layer forming a heat seal between said lid and said liner ply comprising an inner bead formed of the heat sealable composition and facing the interior of the container and an outer bead formed of the heat sealable composition on the opposite side of the heat seal from the inner bead, wherein said inner bead extends further along said heat seal surface toward the interior of the container than said outer bead extends along said heat seal surface toward the exterior of the container.

25. A container according to claim 24, wherein the width of the inner bead is about 90 to about 190 microns and the width of the outer bead is about 60 to about 140 microns.

26. A container according to claim 25, wherein the width of the inner bead is about 130 to about 180 microns and the width of the outer bead is about 80 to about 120 microns.

27. A container according to claim 24, wherein the width of said inner bead is about 10 to about 40% greater than the width of said outer bead.

28. A container according to claim 27, wherein the width of said inner bead is about 20 to about 30% greater than the width of said outer bead.

* * * * *

UNITED STATES PATENT AND TRADEMARK OFFICE
CERTIFICATE OF CORRECTION

PATENT NO.    : 6,264,098 B1
DATED         : July 24, 2001
INVENTOR(S)   : Drummond et al.

It is certified that error appears in the above-identified patent and that said Letters Patent is hereby corrected as shown below:

<u>Title page,</u>
Item [56], References Cited, U.S. PATENT DOCUMENTS, insert the following;

| | | |
|---|---|---|
| --3,274,905 | 9/1966  | Demsey, Jr. et al. |
| 3,196,762   | 7/1965  | Schmeltz |
| 3,162,347   | 12/1964 | Taylor |
| 3,144,193   | 8/1964  | Geist et al. |
| 3,140,808   | 7/1964  | Taylor |
| 3,051,370   | 8/1962  | Hanlon |
| 3,030,001   | 4/1962  | Stump |
| 3,012,707   | 12/1961 | Gray |
| 2,623,681   | 12/1952 | Wilcox |
| 2,623,680   | 12/1952 | Wilcox --. |

Signed and Sealed this

Ninth Day of April, 2002

Attest:

Attesting Officer

JAMES E. ROGAN
*Director of the United States Patent and Trademark Office*